No. 762,977.　　　　　　　　　　　　PATENTED JUNE 21, 1904.
H. H. ARNOLD.
SPRING.
APPLICATION FILED FEB. 12, 1904.
NO MODEL.
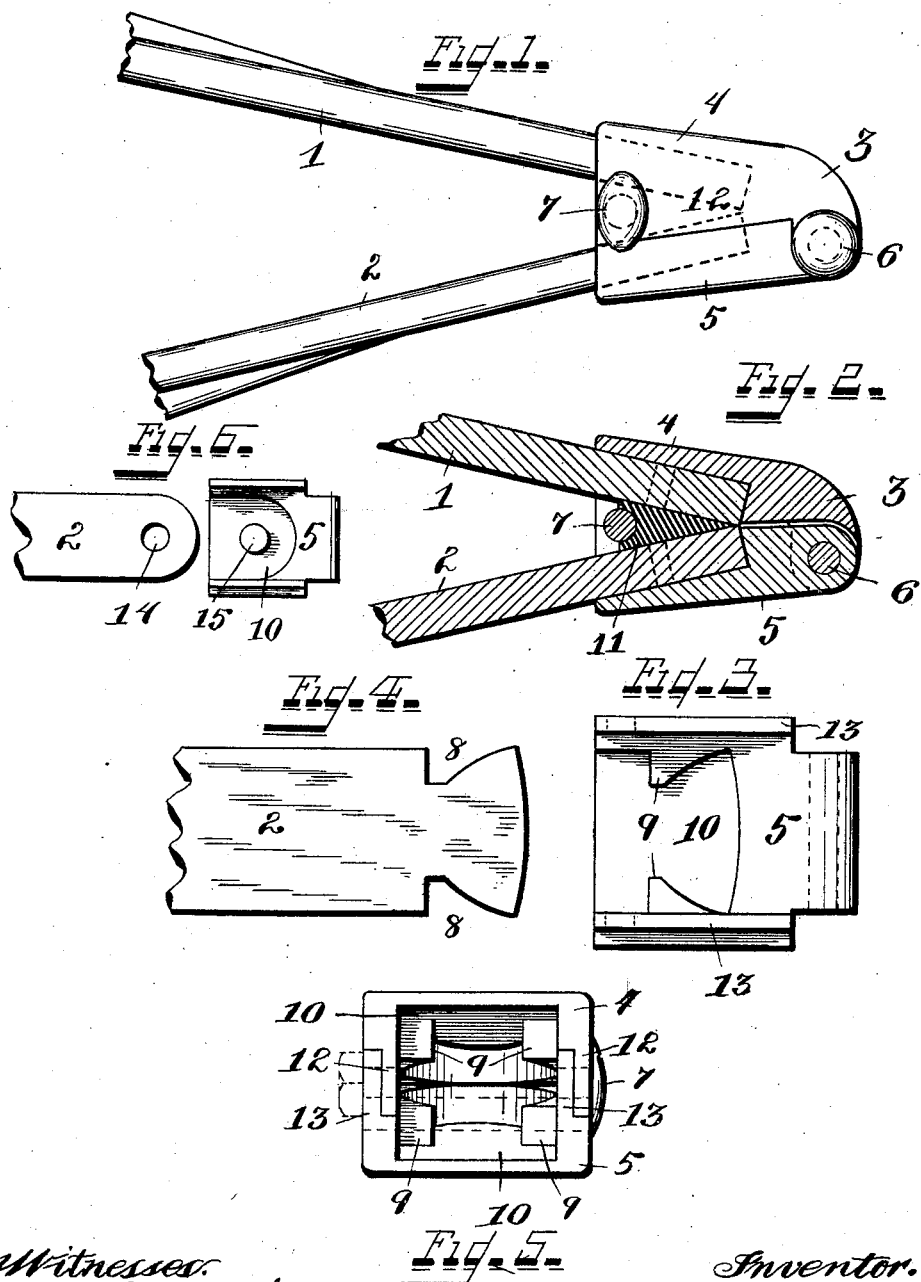
Witnesses:　　　　　　　　　　　　　Inventor.

No. 762,977.

Patented June 21, 1904.

UNITED STATES PATENT OFFICE.

HARRY HOWARD ARNOLD, OF CINCINNATI, OHIO, ASSIGNOR OF ONE-HALF TO FRANK BAUER, OF CINCINNATI, OHIO.

SPRING.

SPECIFICATION forming part of Letters Patent No. 762,977, dated June 21, 1904.

Application filed February 12, 1904. Serial No. 193,291. (No model.)

*To all whom it may concern:*

Be it known that I, HARRY HOWARD ARNOLD, a citizen of the United States, residing at Cincinnati, in the county of Hamilton and State of Ohio, have invented certain new and useful Improvements in Springs, of which the following is a full, clear, and exact description, reference being had to the accompanying drawings, forming part of this specification.

My invention relates to springs, and more particularly to elliptic springs for vehicle use where the two halves of the spring are united together at their ends to form a complete spring; and it has for its object an improved construction of the connection between the two halves of the spring, whereby all welding and consequent machine-work is done away with.

The novelty of my invention will be hereinafter more fully set forth, and specifically pointed out in the claims.

In the drawings, Figure 1 is a broken side elevation of one end of a spring embodying my invention. Fig. 2 is a central sectional side elevation showing the end of the spring as shown in Fig. 1. Fig. 3 is a plan view of the lower connecting-plate; Fig. 4, a plan view of one end of one of the leaves or blades of the spring, showing the cut-out portions forming the connection between the leaves and connecting-plates. Fig. 5 is an end view of the connecting-plates with the leaves of the spring removed and looking from the center of the spring. Fig. 6 is a diminished view of a modification of the connection between the connecting-plates and the leaves of the spring.

The same numerals of reference are used to indicate identical parts in all the figures.

In the drawings, 1 and 2 represent the upper and lower inner leaves of an ordinary elliptic spring. Embracing the meeting ends of the leaves 1 and 2 is a connecting-piece 3, which is composed of an upper plate 4 and lower plate 5, suitably hinged together, as at 6, and provided with a locking-bolt, as at 7, all as clearly shown in Fig. 1.

The ends of the leaves 1 and 2 are notched, as at 8, Fig. 4, and these notches embrace lugs 9, Fig. 3, in recesses 10 in the plates 4 and 5 of the connecting-piece 3 in such manner that when the ends of the leaves are inserted in the plates 4 and 5 of the connecting-piece 3 the lugs 9 in the recesses 10 will engage with the notches 8 in the leaves 1 and 2 to lock the same within the connecting-piece 3 and prevent their withdrawal.

Between the meeting ends of the leaves 1 and 2 and within the connecting-piece 3 is inserted a rubber or other suitable flexible cushion 11, Fig. 2, which is retained in place by the locking-bolt 7. This cushion 11 serves as an antirattler and also permits the leaves 1 and 2 to be distorted when the spring is subjected to pressure.

The sides of the connecting-plates 4 and 5 of the connecting-piece 3 are provided with extending flanges 12 and 13, which overlap each other, as shown in Fig. 5, and form side walls which entirely inclose the meeting ends of the leaves 1 and 2 of the spring, and through these flanges 12 and 13 is passed the locking-bolt 7, which serves to maintain the structure in its proper position.

Referring to the modification shown in Fig. 6, instead of providing notches 8 in the leaves of the spring and lugs 9 to engage therewith in the plates of the connecting-piece I provide an aperture 14 in the ends of the leaves of the spring adapted to engage a projection 15, extending from the recess 10 in the two plates of the connecting-piece 3, as will be readily understood.

While I prefer to construct the notches 8 and lugs 9 as shown, it is obvious that their form may be varied and their location changed without departing from the spirit of my invention, and it will be further observed that by connecting the ends of the leaves in the manner I have shown I do away with all welding and machine-work on the meeting ends of the leaves of the spring, which welding and machine-work is expensive and the welding often injurious to the metal by reason of overheating.

Having thus fully described my invention, I claim—

1. In elliptic-spring construction, the combination of upper and lower inner leaves, having their ends notched to form dovetailed joints, a two-part connecting-piece having recesses to receive the dovetailed ends of the inner leaves, whereby interlocking joints are provided, and bolts for retaining said two-part connecting-piece to lock the same rigidly upon the ends of the leaves.

2. In elliptic-spring construction, the combination of upper and lower inner leaves, having their ends notched to form dovetailed joints, a two-part connecting-piece having recesses to receive the dovetailed ends of the inner leaves, whereby interlocking joints are provided, a cushion inserted between said ends within the two-part connecting-piece, and a bolt for retaining said two-part connecting-piece to lock the same rigidly upon the ends of the leaves.

3. In elliptic-spring construction, the combination of upper and lower inner leaves having their ends adjacent, a two-part hinged connecting-piece embracing said ends, means for locking said two-part hinged connecting-piece, a cushion inserted between the adjacent ends of said leaves and retained in place by said locking means, and lugs within said connecting-piece adapted to engage notches in the sides of the adjacent ends of said leaves, substantially as described.

HARRY HOWARD ARNOLD.

Witnesses:
 EDWARD PECK,
 WM. J. PECK.